A. ARNTZEN & F. RASMUSSEN.
SHAFT COUPLING.
APPLICATION FILED JUNE 8, 1912.
1,163,967.
Patented Dec. 14, 1915.
2 SHEETS—SHEET 1.
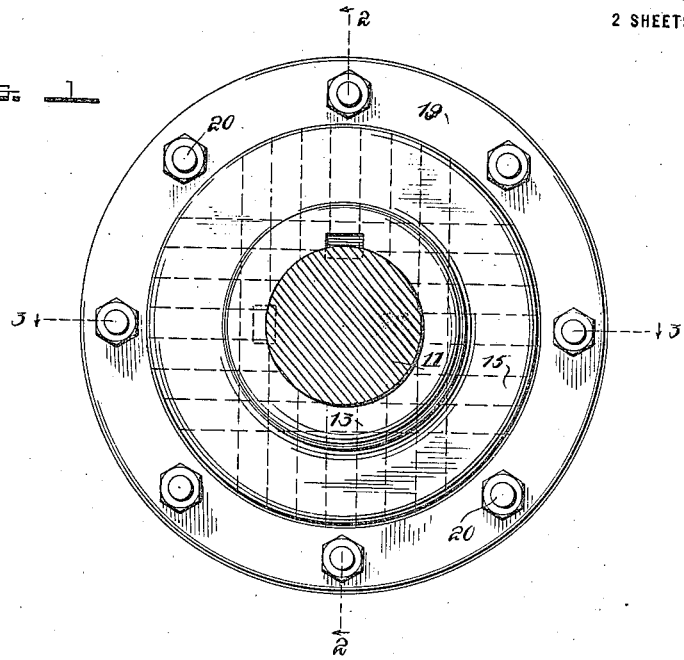
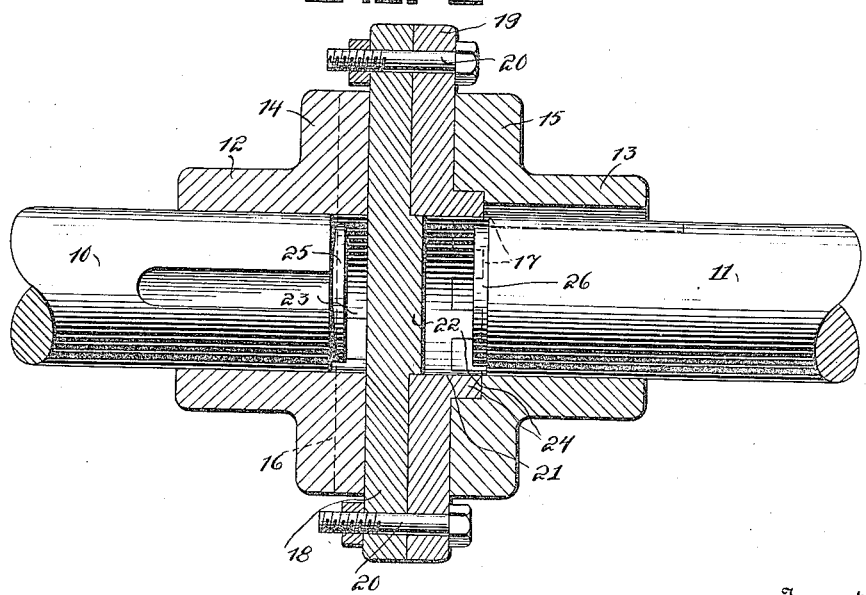
Witnesses
Frank S. Ratcliffe
Henry T. Bright
Inventors
A. Arntzen.
F. Rasmussen.
By Chandler & Chandler
Attorneys

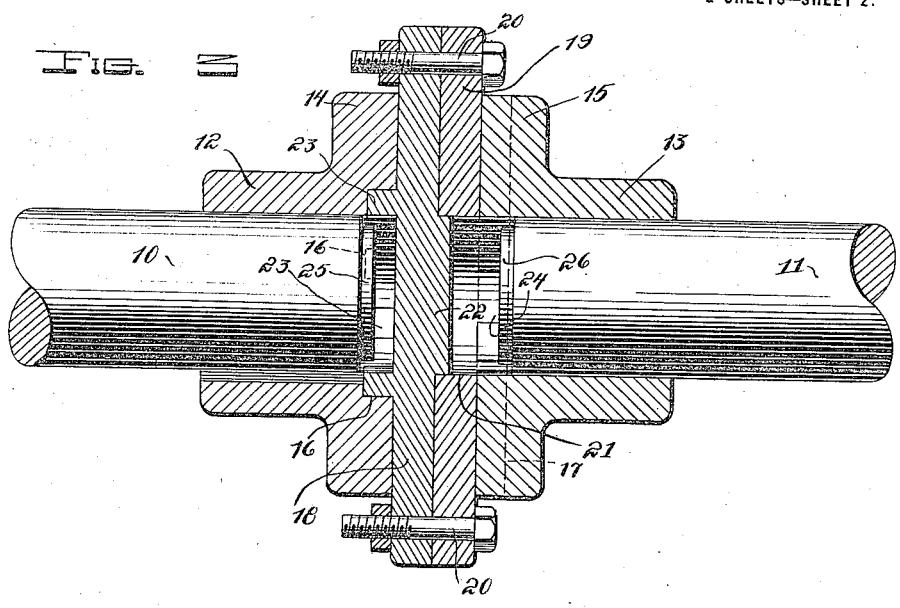

UNITED STATES PATENT OFFICE.

ASBJORN ARNTZEN AND FIND RASMUSSEN, OF BROOKLYN, NEW YORK.

SHAFT-COUPLING.

1,163,967.  Specification of Letters Patent.  Patented Dec. 14, 1915.

Application filed June 8, 1912. Serial No. 702,427.

*To all whom it may concern:*

Be it known that we, ASBJORN ARNTZEN and FIND RASMUSSEN, citizens of Denmark, residing at Brooklyn, in the county of Kings, State of New York, have invented certain new and useful Improvements in Shaft-Couplings; and I do hereby declare the following to be a full, clear, and exact description of the invention, such as will enable others skilled in the art to which it appertains to make and use the same.

This invention relates to shaft couplings and particularly to a type which may be utilized as an emergency coupling or an ordinary power transmission coupling.

The object of the invention resides in the provision of a coupling which may be utilized in an emergency without subjecting any of the parts of the coupling to indeterminable stresses even if shafts are not in true alinement.

A further object of the invention resides in the provision of a coupling in which the parts thereof may be expanded laterally so as to compensate for wear incident to the engagement between the coupling and the shaft sections connected thereby.

A still further object of the invention resides in the provision of a shaft coupling which may be associated with desired shaft sections with ease and facility and which may be disassociated with said sections with equal ease and facility.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a side elevation of a coupling constructed in accordance with the invention, Fig. 2, a section on the line 2—2 of Fig. 1, Fig. 3, a section on the line 3—3 of Fig. 1.

Referring to the drawings 10 and 11 indicate respectively two shaft sections connected together by the coupling. This coupling is shown as comprising collars 12 and 13 keyed respectively on the adjacent ends of the shafts 10 and 11. These collars are provided respectively at their outer ends with enlarged portions 14 and 15 and the adjacent faces of these enlarged portions 14 and 15 are provided respectively with grooves 16 and 17 extending transversely of the collars.

Disposed between the adjacent ends of the shafts 10 and 11 and between the adjacent ends of the collars 12 and 13 are disks 18 and 19 which have a greater diameter than the enlarged portions 14 and 15 and are connected together adjacent their periphery by breakable bolts 20. The disk 19 is provided with a central circular opening 21 disposed in alinement with the shafts 10 and 11 and receiving a cylindrical projecting portion 22 formed on the disk 18 whereby a male and female fit is effected between the disks 18 and 19. This disk 18 is provided on its outer side with a plurality of ribs 23 disposed respectively in the grooves 16 of the collar 12, while the disk 19 is provided on its outer side with a plurality of ribs 24 disposed respectively in the grooves 17 of the collar 13 and in this manner the collars 12 and 13 are operatively connected to the united disks 18 and 19 for rotation with the latter and as the collars 12 and 13 are keyed to respective shafts 10 and 11 it will be apparent that the said shafts are effectively coupled. The shafts 10 and 11 have their adjacent ends provided with reduced portions 25 and 26 respectively which project inwardly of the outer edges of respective ribs 23 and 24 and in this manner serve to catch and support the disks 18 and 19 in the event of rupture of the bolts 20.

It will be noted that the disks 18 and 19 may be separated by loosening the bolts 20 and 20' in order to receive a suitable washer between them to effect the permanent separation of the disks. This separation of the disks 18 and 19 is resorted to when wear in the machinery separates the shafts in endwise directions so as to restore joints to their proper fit. It will be further noted that when the coupling is associated with the shafts 10 and 11 the disks 18 and 19 are moved relatively to each other so as to dispose the ribs 23 and 24 at right angles to each other and by this arrangement of the disks 18 and 19 the coupling can transmit power from one shaft to the other even under the condition of untrue alinement of shafts and the parts of the coupling are locked against displacement.

What is claimed is:

In a shaft coupling, the combination of a pair of shaft members, a pair of disks disposed between the ends of said shaft members, and connected together end to end, one of said disks being provided with an opening, and the other disk having a cylindrical projection engageable in said opening, said disks being further formed with ribs extending across remote ends thereof, and slidably interlocking with the adjacent shaft members, the ribs on one disk being disposed at right angles to the ribs on the other disk.

In testimony whereof we affix our signatures in presence of two witnesses.

ASBJORN ARNTZEN.
FIND RASMUSSEN.

Witnesses:
ALFRED L. PICHARD,
HENRY N. B. RICHARD.